United States Patent
Kato

(10) Patent No.: US 10,898,936 B2
(45) Date of Patent: Jan. 26, 2021

(54) PLASTIC WORKING METHOD FOR MAGNESIUM ALLOY

(71) Applicant: Mitsubishi Heavy Industries Engineering, Ltd., Yokohama (JP)

(72) Inventor: Yoshinori Kato, Tokyo (JP)

(73) Assignee: MITSUBISHI HEAVY INDUSTRIES ENGINEERING, LTD., Yokohama (JP)

( * ) Notice: Subject to any disclaimer, the term of this patent is extended or adjusted under 35 U.S.C. 154(b) by 533 days.

(21) Appl. No.: 15/516,804

(22) PCT Filed: Sep. 14, 2015

(86) PCT No.: PCT/JP2015/076037
§ 371 (c)(1),
(2) Date: Apr. 4, 2017

(87) PCT Pub. No.: WO2016/059924
PCT Pub. Date: Apr. 21, 2016

(65) Prior Publication Data
US 2017/0266707 A1 Sep. 21, 2017

(30) Foreign Application Priority Data
Oct. 15, 2014 (JP) .................... 2014-210582

(51) Int. Cl.
*B21D 5/01* (2006.01)
*B23K 20/12* (2006.01)
*B21D 11/00* (2006.01)

(52) U.S. Cl.
CPC ............ *B21D 5/01* (2013.01); *B21D 11/00* (2013.01); *B23K 20/12* (2013.01)

(58) Field of Classification Search
CPC ...... B21D 5/01; B21D 11/00; B23K 20/1275; B23K 20/12; B23K 20/122
See application file for complete search history.

(56) References Cited

U.S. PATENT DOCUMENTS 6,866,180 B2 * 3/2005 Mahoney ................ B21D 5/02
                                      72/68
7,448,528 B2 * 11/2008 Forrest ................... B21D 22/16
                                    228/112.1

(Continued)

FOREIGN PATENT DOCUMENTS

JP    2002-096158 A    4/2002
JP    2002-144053 A    5/2002

(Continued)

OTHER PUBLICATIONS

PCT/ISA/210, "International Search Report for International Application No. PCT/JP2015/076037," dated Nov. 17, 2015.

(Continued)

*Primary Examiner* — Pradeep C Battula
(74) *Attorney, Agent, or Firm* — Manabu Kanesaka; Benjamin Hauptman; Kenneth Berner

(57) ABSTRACT

A plastic working method for a magnesium alloy, wherein the magnesium alloy is subjected to a friction stir process whereby a probe at the tip portion of a tool rotating around an axial line is press-fitted to the surface of the magnesium alloy, the magnesium alloy is heated and softened by friction between the magnesium alloy and the rotating tool, and the tool is moved parallel to the surface of the magnesium alloy while the tool is rotated with the probe in the press-fitted state. When the length in a first direction of the region of the magnesium alloy being plastically worked is A, and the amount of shrinkage of the magnesium alloy in the first direction due to the friction stir process is α, A+α is set as the length in the first direction of the region subjected to the friction stir process.

6 Claims, 5 Drawing Sheets

(56) References Cited

U.S. PATENT DOCUMENTS

| | | | |
|---|---|---|---|
| 10,566,032 B2 * | 2/2020 | Coffey | B23K 20/122 |
| 2012/0301603 A1 | 11/2012 | Carlson et al. | |
| 2016/0354861 A1 * | 12/2016 | Xu | B23K 20/1275 |

FOREIGN PATENT DOCUMENTS

| | | | |
|---|---|---|---|
| JP | 2004-074255 A | | 3/2004 |
| JP | 2006083435 A | * | 3/2006 |
| JP | 2007-107039 A | | 4/2007 |
| JP | 4792271 B2 | | 10/2011 |
| JP | 2013-086114 A | | 5/2013 |
| JP | 2013-121622 A | | 6/2013 |

OTHER PUBLICATIONS

PCT/ISA/237 "Written Opinion of the International Searching Authority for International Application No. PCT/JP2015/076037," dated Nov. 17, 2015.

Harai, Y., et al., "Microstructures and Mechanical Properties of AZ61 Magnesium Alloy after Processing with High Presser Torsion," J. Japan Inst. Metals, 2007, p. 213-217, vol. 71, No. 2.

Fukagawa, K., Fundamental Study on Bending of Ca Added Magnesium Alloys, Bulletin of the Faculty of Education, Kagoshima University, Natural Science, Mar. 14, 2011, p. 65-71, vol. 62.

* cited by examiner

PLASTIC WORKING METHOD FOR MAGNESIUM ALLOY

TECHNICAL FIELD

The present invention relates to a plastic working method for a magnesium alloy.

Priority is claimed on Japanese Patent Application No. 2014-210582, filed on Oct. 15, 2014, the content of which is incorporated herein by reference.

BACKGROUND ART

Magnesium alloys are used due to their high strength, excellent recyclability, rich amount of resources, electromagnetic wave-shielding properties, and favorable machinability.

However, magnesium alloys have, particularly, poor ductility and poor workability due to their dense hexagonal lattice structure, and thus there is a need for improving room-temperature strength or ductility by decreasing the crystal grain sizes by means of warm shaping and strong deformation working, but it is necessary to provide a heating device and a temperature adjustment and control device to plastic working machines, which makes the constitution complicated.

As techniques for plastically working magnesium alloys, there is a proposal of a friction stir process in which friction stir welding (hereinafter, in some cases, referred to as "FSW") is deployed and modification is carried out by friction-stirring the surface of an alloy compact (hereinafter, in some cases, modification by means of friction stirring will be referred to as "FSP"). PTL 1 proposes improvement of the strength or workability of magnesium alloy compacts or aluminum alloy compacts by means of friction stirring.

CITATION LIST

Patent Literature

[PTL 1] Japanese Unexamined Patent Application Publication No. 2004-74255

SUMMARY OF INVENTION

Technical Problem

However, magnesium alloys to which calcium is added in order to improve the flame resistance produce aluminum-calcium-based intermetallic compounds, and thus there is a problem in that the plastic workability is deteriorated more than in ordinary magnesium alloys due to the improved flame resistance and cracking and the like occur during plastic working.

In addition, a phenomenon in which strain is generated in magnesium alloys due to heat input by friction stirring is observed, and there is a demand for solving this problem.

The present invention has been made in consideration of the above-described circumstances and aims to achieve the following objects.

1. To improve the plastic workability of magnesium alloys at room temperature
2. To prevent the generation of strain by preferably controlling the temperature state during modification in plastic working of magnesium alloys
3. To prevent the occurrence of cracking in plastic working of magnesium alloys

Solution to Problem

According to a first aspect of the present invention, the above-described objects are achieved by, in a plastic working method for a magnesium alloy which is a method for plastically working a magnesium alloy by carrying out a friction stir process in which a probe at a tip portion of a tool rotating around an axis line is press-fitted to a surface portion of the magnesium alloy, the surface portion is heated and softened by friction between the magnesium alloy and the rotating tool, and the tool is moved parallel to the surface of the magnesium alloy while the magnesium alloy in the vicinity of the probe is stirred by rotating the tool in a state of being press-fitted by the probe, thereby modifying the magnesium alloy, in a case in which a length of a region in which the magnesium alloy is plastically worked in a first direction is represented by A, and an amount of shrinkage of the magnesium alloy in the first direction due to the friction stir process is represented by $\alpha$, a length of a region in which the friction stir process is carried out in the first direction is set to A+$\alpha$.

According to a second aspect of the present invention, in the plastic working method for a magnesium alloy, the friction stir process is carried out on the entire region in which the magnesium alloy is plastically worked.

According to a third aspect of the present invention, in the plastic working method for a magnesium alloy, the plastic working is bending, and the length A of the region in which the plastic working is carried out in the first direction can be set as an outside arc length formed in a bent portion.

According to a fourth aspect of the present invention, in the plastic working method for a magnesium alloy, in the friction stir process, when the tool is moved a predetermined length in a direction orthogonal to the first direction and is then reciprocally moved so as to form stripes adjacent to each other in the first direction, thereby modifying the magnesium alloy, a movement state of the tool is preferably set so that these stripe-shaped modified regions become continuous in a single layer.

According to a fifth aspect of the present invention, in the plastic working method for a magnesium alloy, in the region in which the friction stir process is carried out, friction stir process conditions can be set so as to have a predetermined distribution of a heat input state of the magnesium alloy formed by the friction stir process in the first direction.

According to a sixth aspect of the present invention, in the plastic working method for a magnesium alloy, the plastic working is bending for forming a bent line, the bent line is provided in a central location in the first direction in the region in which plastic working is carried out, and, in the region in which the friction stir process is carried out, there are cases in which friction stir process conditions are set so that the heat input state of the magnesium alloy formed by the friction stir process decreases in a direction from the bent line toward a central outside of the first direction.

According to the first aspect of the present invention, the plastic working method for a magnesium alloy which is a method for plastically working a magnesium alloy by carrying out a friction stir process in which a probe at a tip portion of a tool rotating around an axis line is press-fitted to a surface portion of the magnesium alloy, the surface portion is heated and softened by friction between the magnesium alloy and the rotating tool, and the tool is moved parallel to the surface of the magnesium alloy while the magnesium alloy in the vicinity of the probe is stirred by rotating the tool in a state of being press-fitted by the probe, thereby modifying the magnesium alloy, and, in a case in which the length of the region in which the magnesium alloy is plastically worked in the first direction is represented by A, and the amount of shrinkage of the magnesium alloy in the first direction due to the friction stir process is represented by α, when the length of the region in which the friction stir process is carried out in the first direction is set to A+α, intermetallic compounds and crystal grains are miniaturized in the region in which the friction stir process is carried out, and thus it is possible to prevent the generation of cracks in the magnesium alloy even after plastic working by making the region in which plastic working is carried out sufficiently plastically workable and suppress the generation of strain by decreasing the size of the region in which the friction stir process is carried out to the minimum necessary extent and decreasing the input of heat into the magnesium alloy.

Meanwhile, the surface portion refers to a portion from the surface of the magnesium alloy to a depth at which the probe can be press-fitted.

According to the second aspect of the present invention, in the plastic working method for a magnesium alloy, since the friction stir process is carried out on the entire region in which the magnesium alloy is plastically worked, there are no portions in which the friction stir process is not partially carried out in the region in which plastic working is carried out, and thus it is possible to prevent the generation of cracks in the magnesium alloy even after plastic working.

According to the third aspect of the present invention, in the plastic working method for a magnesium alloy, since the plastic working is bending, and the length A of the region in which the plastic working is carried out in the first direction is set as the outside arc length formed in the bent portion, it is possible to enable necessary bending by carrying out the friction stir process in a minimum region necessary for bending and prevent the generation of strain by decreasing the input of heat into the magnesium alloy.

According to the fourth aspect of the present invention, in the plastic working method for a magnesium alloy, in the friction stir process, when the tool is moved a predetermined length in the direction orthogonal to the first direction and is then reciprocally moved so as to form stripes adjacent to each other in the first direction, thereby modifying the magnesium alloy, since the movement state of the tool is set so that the stripe-shaped modified regions become continuous in a single layer, there are no portions in which the friction stir process is not partially carried out in the region in which plastic working is carried out, and thus it is possible to prevent the generation of cracks in the magnesium alloy even after plastic working and prevent the generation of strain by decreasing the input of heat into the magnesium alloy.

Meanwhile, in the reciprocal movement, the directions in which the tool is moved forward and backward can be set to the same direction or opposite directions.

According to the fifth aspect of the present invention, in the plastic working method for a magnesium alloy, in the region in which the friction stir process is carried out, since the friction stir process conditions are set so as to have a predetermined distribution of a heat input state of the magnesium alloy formed by the friction stir process in the first direction, it is possible to satisfy conditions necessary for plastic working, enable plastic working by decreasing the input of heat during the friction stir process into regions adjacent to this worked region, and prevent the generation of strain in the adjacent regions.

According to the sixth aspect of the present invention, in the plastic working method for a magnesium alloy, since the plastic working is bending for forming the bent line, the bent line is provided in the central location in the first direction in the region in which plastic working is carried out, and, in the region in which the friction stir process is carried out, there are cases in which friction stir process conditions are set so that the heat input state of the magnesium alloy formed by the friction stir process decreases in a direction from the bent line toward a central outside of the first direction, it is possible to carry out the friction stir process necessary for bending so that heat is input most in the vicinity of the bent line, enable bending by decreasing the input of heat into the regions adjacent to the region in which plastic working is carried out compared with the above-described portion, and prevent the generation of strain in the adjacent regions.

Advantageous Effects of Invention

According to the above-described constitutions, it becomes possible to exhibit effects in which it is possible to favorably carry out plastic working in magnesium alloys and prevent the generation of strain arising from friction stir processes.

DESCRIPTION OF EMBODIMENTS

Hereinafter, a first embodiment of a plastic working method for a magnesium alloy according to the present invention will be described on the basis of the accompanying drawings.

Figure 1:
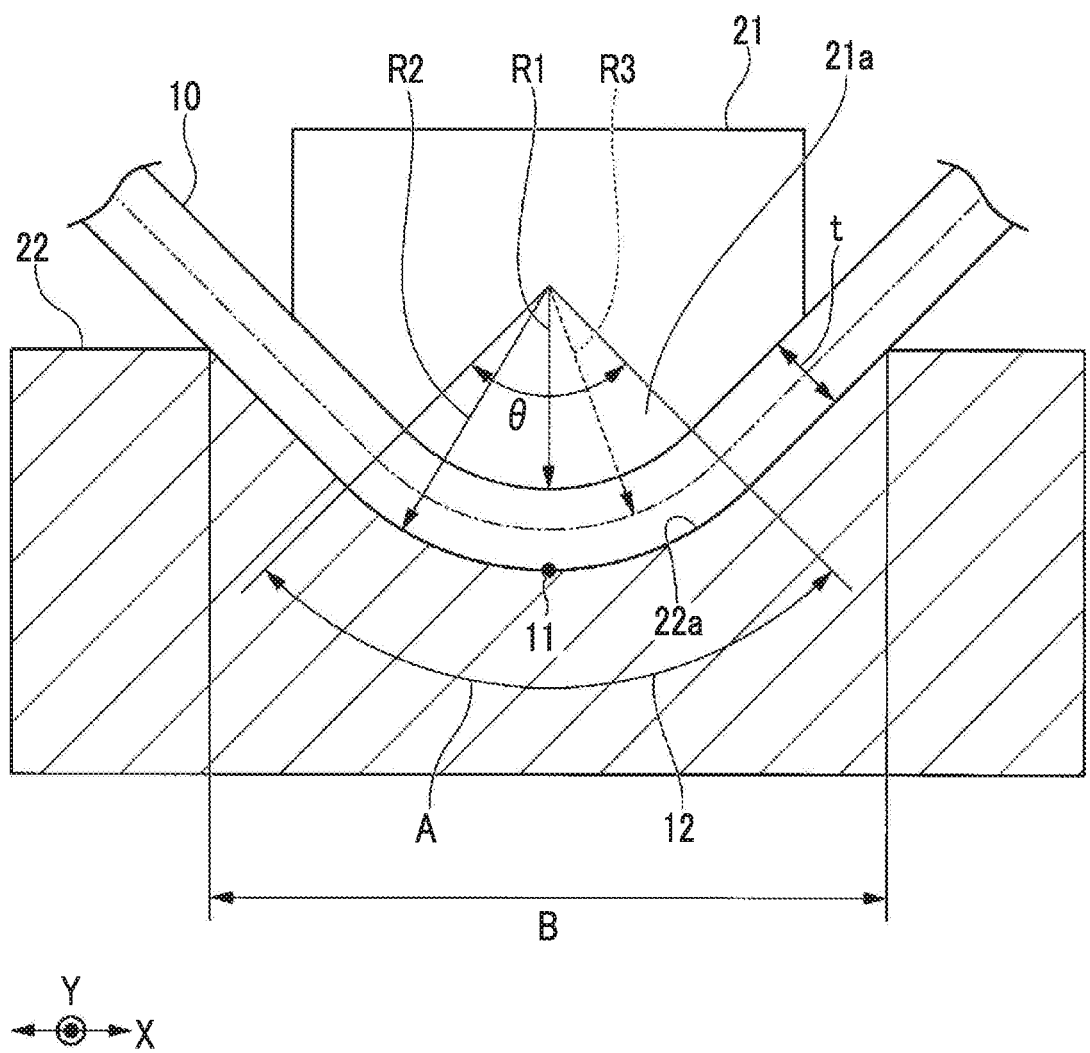
FIG. 1 is a cross-sectional view illustrating plastic working in a first embodiment of a plastic working method for a magnesium alloy according to the present invention.
Figure 2:
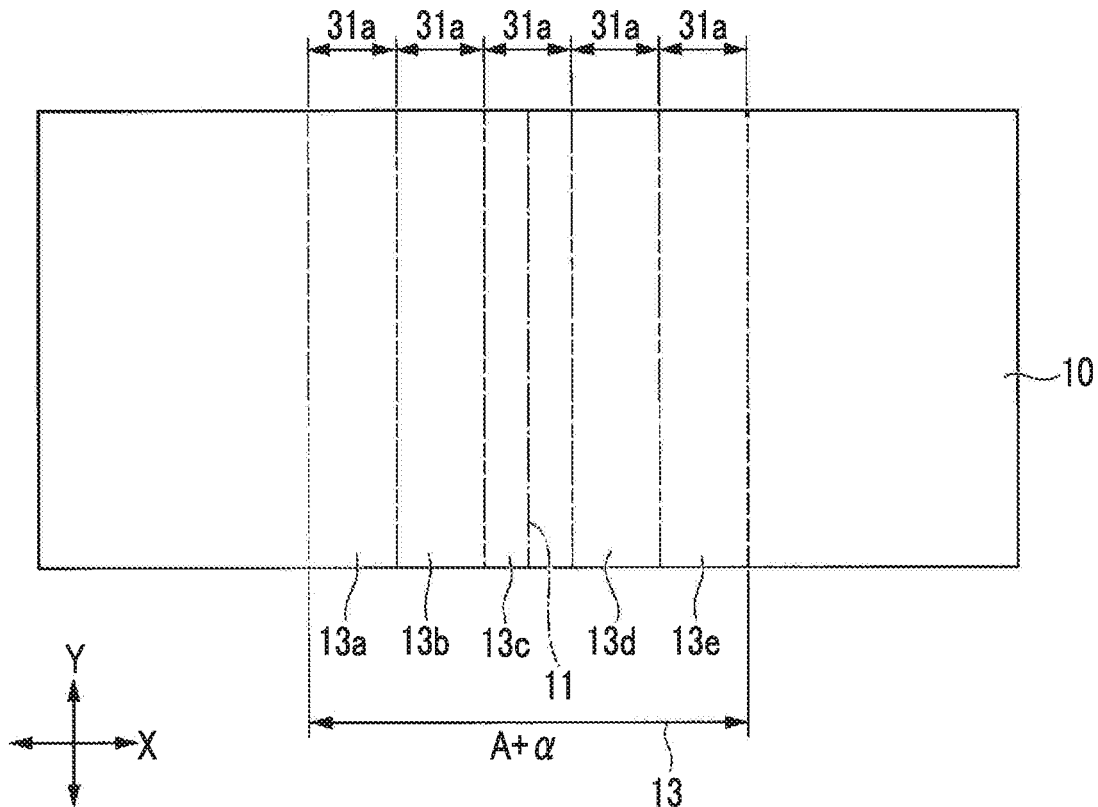
FIG. 2 is a plan view illustrating a friction stir process in the first embodiment of the plastic working method for a magnesium alloy according to the present invention.
Figure 3:
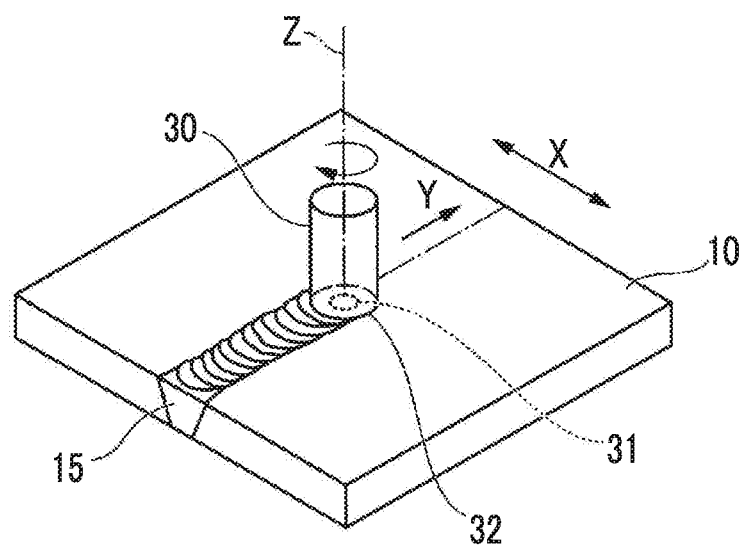
FIG. 3 is a perspective view illustrating the friction stir process in the first embodiment of the plastic working method for a magnesium alloy according to the present invention.
Figure 4:
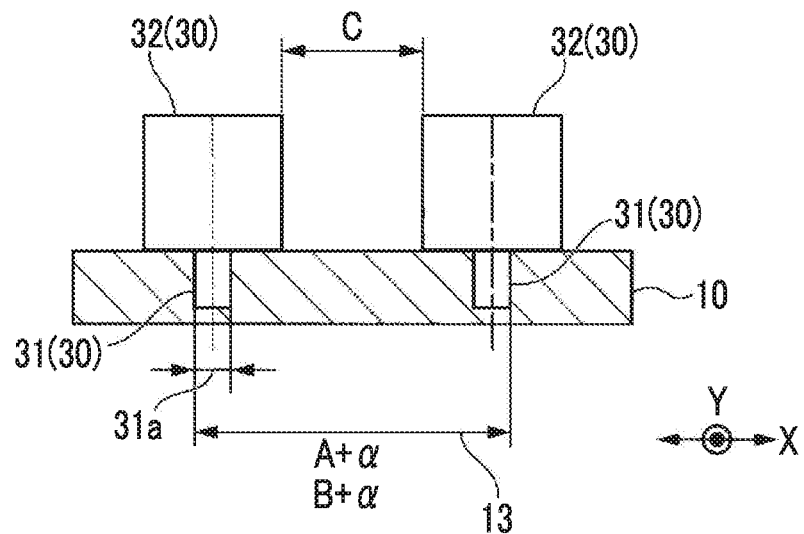
FIG. 4 is a cross-sectional view illustrating the friction stir process in the first embodiment of the plastic working method for a magnesium alloy according to the present invention.
Figure 5:
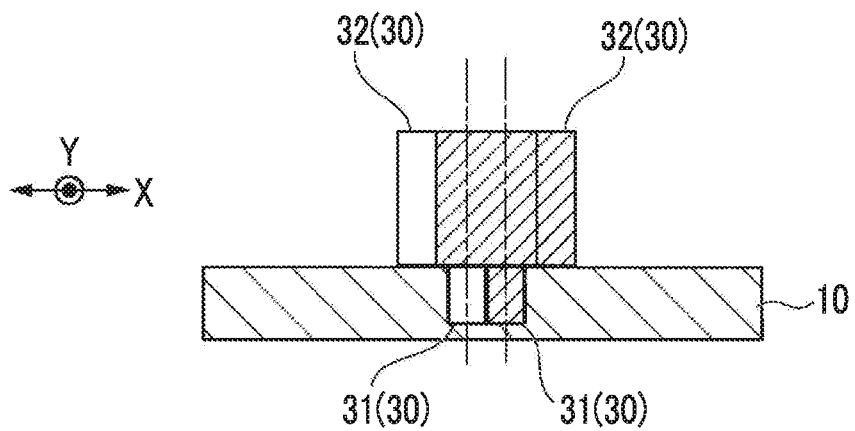
FIG. 5 is a cross-sectional view illustrating the friction stir process in the first embodiment of the plastic working method for a magnesium alloy according to the present invention.

FIG. 1 is a cross-sectional view illustrating the plastic working method for a magnesium alloy in the present embodiment. FIG. 2 is a plan view illustrating the plastic working method for a magnesium alloy in the present embodiment. FIG. 3 is a perspective view illustrating a friction stir process in the plastic working method for a magnesium alloy in the present embodiment. FIGS. 4 and 5 are cross-sectional views illustrating the friction stir process in the plastic working method for a magnesium alloy of the present embodiment. In the drawings, reference sign 10 indicates a magnesium alloy.

In the plastic working method for a magnesium alloy according to the present embodiment, applicable magnesium alloy materials are not limited to their chemical component compositions, and a variety of kinds of materials are applicable. Examples of the applicable magnesium alloy materials include magnesium alloy materials having a composition which includes one or more elements selected from the group consisting of Al, Zn, Zr, Mn, Fe, Si, Cu, Ni, and Ca with a remainder consisting of Mg and inevitable impurities.

Examples of the applicable magnesium alloys include ASTM AZ9169, AZ31, AZ91, and AZ92. Furthermore, magnesium alloy castings and magnesium alloy die casts described in JIS H5203 and H5303 are also applicable.

In the plastic working method for a magnesium alloy according to the present embodiment, as illustrated in FIG. 1, bending is applied, and, as the shape of the magnesium alloy material which is not limited, for example, a plate shape will be described. Additionally, the shape of the magnesium alloy material may be a rod shape or a tube shape, and other shapes may also be employed as long as the bending angles can be set. In addition, the thickness t of the magnesium alloy material is also not limited, and it is possible to set the desirable upper limit value of the thickness of the material to 30 mm (particularly desirably 10 mm) and set the desirable lower limit value to 1 mm (particularly desirably 3 mm).

In the plastic working method for a magnesium alloy according to the present embodiment, as illustrated in FIG. 1, V bending in which a magnesium alloy 10 which is, for example, a plate body is pressed using a die set made up of a punch 21 and a die 22 is carried out.

As illustrated in FIG. 1, the punch 21 has a tip portion 21a extending in a Y direction in which a bent line 11 is formed. Along the punch 21, the die 22 has a groove portion 22a formed so as to extend in the Y direction. The magnesium alloy 10 is sandwiched and pressed between the punch 21 and the die 22, thereby forming a bent portion 12.

In an X direction (first direction) orthogonal to the Y direction in which the bent line 11 is formed, the tip portion 21a of the punch 21 has a curvature radius R1, and accordingly, the groove portion 22a of the die 22 has a curvature radius R2. The opening width of the groove portion 22a in the X direction is set to B.

The bent portion 12 of the bent magnesium alloy 10 is worked so as to form a bent surface having almost the same curvature radius as the curvature radius R2. In the bent portion 12 of the magnesium alloy 10, the X-direction length of the outside surface thereof, that is, the arc-shaped length is set to reach A.

In the plastic working method for a magnesium alloy according to the present embodiment, as illustrated in FIG. 2, in the magnesium alloy 10 before being bent, a to-be-worked region 13 is set.

The to-be-worked region 13 is turned into a region corresponding to the bent portion 12 illustrated in FIG. 1 by means of bending. The to-be-worked region 13 is set to have the bent line 11 located in the center in the X direction (first direction) and have a predetermined width on either side of the center along the X direction. The to-be-worked region 13 is a region in which plastic working (bending) is carried out and is a friction stir region 13 in which, before a bending step, a modification step by means of a friction stir process is carried out.

The friction stir region 13 is a region in which a friction stir process is carried out.

As illustrated in FIG. 3, the friction stir process is carried out using a probe 31 at the tip portion of a tool 30 rotating around an axis line Z which approximately corresponds to the normal line to the plate-shaped magnesium alloy 10.

The probe 31 is press-fitted to a surface portion of the magnesium alloy 10, the surface portion is heated and softened by friction between the magnesium alloy and the rotating tool 30, and the tool 30 is moved parallel to the surface of the magnesium alloy 10 while the magnesium alloy in the vicinity of the probe 31 is stirred by rotating the tool 30 in a state of being press-fitted by the probe 31, thereby modifying the magnesium alloy.

The tool 30 has a cylindrical shoulder 32 capable of rotating around the axis line Z and the pin-shaped probe 31 which is provided on the tip side of the shoulder 32 and is capable of rotating. The diameter of at least a tip portion of the shoulder 32 is set to be larger than the diameter of the probe 31. In the present embodiment, the shoulder 32 is set to be rotatable around the axis line Z using driving means which is not illustrated. In a rotation central portion of an end surface of the shoulder 32, the probe 31 is provided so as to protrude coaxially with the axis line Z of the shoulder 32. The shoulder 32 and the probe 31 are set to be integrally rotatable around the axis line Z.

The tool 30 is made of a material having a higher melting point and higher hardness than the magnesium alloy 10 and can be formed of, for example, tool steel, carbide, ceramic, or the like.

In the friction stir process of the present embodiment, the shoulder 32 diameter, the probe 31 diameter, the Z-direction length, and other formal elements of the tool 30 are appropriately selected in consideration of operation conditions such as the kind and properties of the magnesium alloy 10 to be modified and the rotation speed and Y-direction moving speed of the tool 30. Particularly, as illustrated in FIG. 4, the probe 31 in the present embodiment has a diameter 31a in the X direction.

In the friction stir process of the present embodiment, as illustrated in FIG. 3, the probe 31 at the tip portion of the tool 30 is press-fitted to the surface of the magnesium alloy 10, the magnesium alloy 10 is heated and softened by friction between the magnesium alloy and the shoulder 32 of the rotating tool 30, and the tool 30 is moved in the Y direction which is parallel to the surface of the magnesium alloy 10 while the magnesium alloy 10 in the vicinity of the probe 31 is stirred by continuously rotating the tool 30 in a state of being press-fitted by the probe 31.

When the tool 30 is moved, the magnesium alloy 10 is continuously stirred in the Y direction in succession, and, after the tool 30 has been moved in the Y direction, extremely shallow dents having an approximately round shape are generated due to the contact of the shoulder 32, the dents are intermittently distorted in succession and are superimposed with each other, and thus arc-shaped marks remain in parallel. This drawing schematically illustrates the trajectory of the tool 30 and marks and also schematically illustrates the trajectory of the shaft of the tool 30 moved in the friction stir process.

In the friction stir process of the present embodiment, as illustrated in FIG. 3, the tool 30 rotates clockwise and moves parallel to the surface of the magnesium alloy 10 in the arrow Y direction.

In the present embodiment, first, friction stirring is carried out by moving the tool 30 in a direction considered as the Y direction so as to form a stripe-shaped modified region 13a, then, as illustrated in FIG. 2, the tool 30 is temporarily pulled up and moved in the X direction as much as the same length as the diameter of the probe 31, the probe 31 is press-fitted to a stripe-shaped modified region 13b which is adjacent to the previously-formed stripe-shaped modified region 13a without any gaps, and the tool is moved parallel to the surface of the magnesium alloy 10 in the reverse direction to that for the stripe-shaped modified region 13a along the direction considered as the Y direction.

After the completion of the treatment of the stripe-shaped modified region 13b, subsequently, the tool 30 is temporarily pulled up and moved in the Y direction as much as the same length as the diameter 31a of the probe 31 in the same manner as described above, and a stripe-shaped modified region 13c which is adjacent to the previously-formed stripe-shaped modified region 13b without any gaps is friction-stirred as illustrated in FIG. 2. In the same manner, adjacent stripe-shaped modified region 13d and stripe-shaped modified region 13e are friction-stirred.

In the friction stir process of the present embodiment, as illustrated in FIG. 2, all of the stripe-shaped modified regions 13a to 13e are located so as to be adjacent to each other but not superimpose each other. In the drawing, the friction stir region 13 is illustrated to include five stripe-shaped modified regions 13a to 13e, but the number of stripe-shaped modified regions can be appropriately set depending on the widths of the stripe-shaped modified regions 13a to 13e which can be modified by a single friction stir process such as the diameter 31a or the like of the probe 31.

Specifically, as illustrated in FIG. 5, the tool 30 illustrated on the left side of the drawing indicates the X-direction location in the friction stir process carried out earlier, and the probe 31 is located in the subsequent treatment so as to be adjacent to the location of the probe 31 in the former treatment in the X direction so that the tool 30 used to treat the next adjacent stripe-shaped modified region is located in the hatched location on the right side of the drawing. In the drawing, the location of the probe 31 corresponds to the X-direction locations of the adjacent stripe-shaped modified regions 13a to 13e.

At the same time, in the friction stir process of the present embodiment, the movement trajectory of the tool 30 is set so as to cover the entire friction stir region 13, that is, the entire to-be-worked region 13.

Specifically, as illustrated in FIG. 5, the outside of the probe 31 can be set to be located at both boundary portions of the to-be-worked region 13 in the X direction respectively. That is, the outside of the probe is set so that the entire friction stir region 13 is covered with a plurality of the stripe-shaped modified regions 13a to 13e.

In the friction stir process of the present embodiment, the width in the X direction of the friction stir region 13 on which the friction stir process is carried out is set to reach the sum A+α of the length A of the outside arc of the bent portion 12 illustrated in FIG. 1 and the amount of shrinkage α of the magnesium alloy 10 being shrunk in the X direction due to the friction stir process.

Here, α varies depending on the process conditions of the friction stir process, the composition of the magnesium alloy 10, and the like, but is approximately in a range of 0.1 to 0.9 mm, preferably in a range of 0.3 to 0.7 mm, and more preferably in a range of 0.4 to 0.6 mm and is set to reach approximately 0.5 mm.

That is, the width of the friction stir region 13 in the X direction can be expressed as follows with respect to the thickness t of the magnesium alloy 10, the curvature radius R1 of the punch 21 tip, and the bending angle θ:

$$\alpha + 2\pi(R1+t) \times \theta/360.$$

In the friction stir process of the present embodiment, the surface of the magnesium alloy 10 is heated to a temperature at which the surface becomes plastically deformable and is stirred using the probe 30, and after the cooling of the magnesium alloy 10, crystal grains in the friction stir region 13 are miniaturized and intermetallic compounds are miniaturized, whereby the modified region 15 is formed.

The width in the X direction of the modified region 15 by means of friction stirring is dependent on the friction stirring conditions such as the shoulder 32 diameter, the probe 31 diameter, and the Z-direction length of the of the tool 30, the material of the magnesium alloy 10, the rotation speed of the tool 30, and the Y-direction moving speed. Particularly, when the diameter 31a of the probe 31 is larger than the diameter of the shoulder 32, the modified region 15 is provided with a width close to the shoulder 32 diameter even in a portion deep below the shoulder 32, and when the diameter 31a of the probe 31 is smaller than the diameter of the shoulder 32, the width of the modified region 15 becomes narrow. In addition, when the probe 31 length is short, the width of the modified region 15 at a deep portion of the magnesium alloy 10 becomes narrow.

In the friction stir process of the present embodiment, the rotation speed of the tool 30 can be set in a range of 500 to 1,500 rpm and more preferably set in a range of 800 to 1,000 rpm, and, in such a case, it is possible to reliably improve the workability of the magnesium alloy 10.

In addition, in the friction stir process of the present embodiment, the relative moving speed in the Y direction of the tool 30 with respect to the magnesium alloy 10 can be set in a range of 100 to 800 mm/min and more preferably set in a range of 200 to 500 mm/min, and, in such a case, it is possible to reliably improve the workability of the magnesium alloy 10.

In addition, in the friction stir region 13, the crystal grains can be formed so that the average grain size is in a range of 0.01 μm to 20 μm and more preferably in a range of 0.1 μm to 3 μm, and, in such a case, it is possible to reliably improve the workability of the magnesium alloy 10.

In the friction stir process of the present embodiment, a distribution of modification states is formed in the friction stir region 13 by setting friction stir conditions such as the rotation speed, the Y-direction moving speed, and the like of the tool 30.

In the friction stir process, it is possible to control the input of heat into the magnesium alloy 10 by setting the friction stir conditions such as the rotation speed, the Y-direction moving speed, and the like of the tool 30. Specifically, at the same moving speed, when the rotation speed of the tool 30 is sped up (increased), the input of heat into the magnesium alloy 10 increases, and, when the rotation speed of the tool 30 is decreased, the input of heat into the magnesium alloy 10 decreases. In addition, at the same rotation speed, when the moving speed of the tool 30 in the Y direction is sped up, the input of heat into the magnesium alloy 10 decreases, and, when the moving speed of the tool 30 in the Y direction is slowed, the input of heat into the magnesium alloy 10 increases.

In the friction stir process of the present embodiment, in a portion of the friction stir region 13 in which the occurrence of plastic deformation during bending is most required, the input of heat into the magnesium alloy 10 is increased, thereby forming a modification state in which the crystal grains and the intermetallic compounds are further miniaturized in the magnesium alloy 10. In addition, in portions adjacent to non-modified regions such as peripheral portions of the friction stir region 13, the input of heat into the magnesium alloy 10 is decreased, thereby forming a modification state in which the crystal grains and the intermetallic compounds are miniaturized to a slight extent in the magnesium alloy 10.

Specifically, in the friction stir region 13, in the stripe-shaped modified region 13c located in the center in the X direction of the friction stir region 13 in which the bent line 11 is located as illustrated in FIG. 2, the input of heat into the magnesium alloy 10 is increased by setting the rotation speed of the tool 30 to be sped up (increased) or the moving speed in the Y direction of the tool 30 to slow, thereby forming a modification state in which the crystal grains and the intermetallic compounds are further miniaturized in the magnesium alloy 10.

In the stripe-shaped modified region 13b and the stripe-shaped modified region 13d located adjacent to both sides of the stripe-shaped modified region 13c in the X direction, conditions that are more suppressed than the friction stir conditions for the stripe-shaped modified region 13c, that is, conditions that further decrease the rotation speed of the tool 30 or further speed up the moving speed in the Y direction of the tool 30 are set, and the input of heat into the magnesium alloy 10 is further decreased than the input of heat into the magnesium alloy 10 in the stripe-shaped modified region 13c, thereby forming a modification state in which the crystal grains and the intermetallic compounds are not relatively miniaturized in the magnesium alloy 10.

Furthermore, in the stripe-shaped modified region 13a and the stripe-shaped modified region 13e which are disposed adjacent to both outsides of the stripe-shaped modified region 13b and the stripe-shaped modified region 13d in the X direction and are located further away from the bent line 11, conditions that are more suppressed than the friction stir conditions for the stripe-shaped modified region 13b and the stripe-shaped modified region 13d, that is, conditions that further decrease the rotation speed of the tool 30 or further speed up the moving speed in the Y direction of the tool 30 are set, and the input of heat into the magnesium alloy 10 is further decreased than the input of heat into the magnesium alloy 10 in the stripe-shaped modified region 13b and the stripe-shaped modified region 13d, thereby forming a modification state in which the miniaturization of the crystal grains and the intermetallic compounds is suppressed in the magnesium alloy 10.

The distribution of the modification states formed in the friction stir region 13 is not limited to the above-described conditions, and, for example, in the circumferential edge location of the friction stir region 13 from which heat input from the tool 30 easily escapes, it is also possible to form a modification state in which the crystal grains and the intermetallic compounds are uniformly miniaturized throughout the friction stir region 13 in the magnesium alloy 10 by further increasing the amount of heat input into the magnesium alloy 10.

In addition, as another example of the distribution of the modification states formed in the friction stir region 13, the stripe-shaped modified region 13c is friction-stirred under the same conditions as the above-described conditions, and the stripe-shaped modified region 13b, the stripe-shaped modified region 13d, the stripe-shaped modified region 13a, and the stripe-shaped modified region 13e are friction-stirred while being cooled, whereby the input of heat into the magnesium alloy 10 can be decreased. In this case, in the stripe-shaped modified regions 13b, 13d, 13a, and 13e, the input of heat can be controlled by cooling the magnesium alloy 10 by applying cold air and cold water to the magnesium alloy during the friction stirring.

Alternatively, in the stripe-shaped modified regions 13b, 13d, 13a, and 13e, it is possible to use the same friction stirring conditions in which the input of heat is smaller than in the stripe-shaped modified region 13c, and, in such a case, it is possible to form a high modification state in the stripe-shaped modified region 13c in the center and uniformly form a low modification state in the other stripe-shaped modified regions 13b, 13d, 13a, and 13e.

In the plastic working method for a magnesium alloy of the present embodiment, the intermetallic compounds and the crystal grains are miniaturized in the friction stir region 13 in which the friction stir process has been carried out, and thus it is possible to improve workability by making the to-be-worked region 13 in which plastic working is carried out sufficiently plastically workable so as to prevent the generation of cracks in the magnesium alloy 10 even after bending and sufficiently suppress the generation of strain in the magnesium alloy 10 by decreasing the size of the friction stir region 13 to the minimum necessary extent and setting the input of heat into the magnesium alloy 10 due to the friction stir process to the minimum necessary extent.

In the plastic working method for a magnesium alloy of the present embodiment, the input of heat into the magnesium alloy 10 due to the friction stir process is set to have a predetermined distribution in the friction stir region 13 in which the friction stir process is carried out, and thus it is possible to improve workability by making the to-be-worked region 13 in which plastic working is carried out sufficiently plastically workable so as to prevent the generation of cracks in the magnesium alloy 10 even after bending and set the modification state in which the intermetallic compounds and the crystal grains in the magnesium alloy 10 are miniaturized to have a distribution.

Hereinafter, a second embodiment of the plastic working method for a magnesium alloy according to the present invention will be described on the basis of the accompanying drawings.

Figure 6:
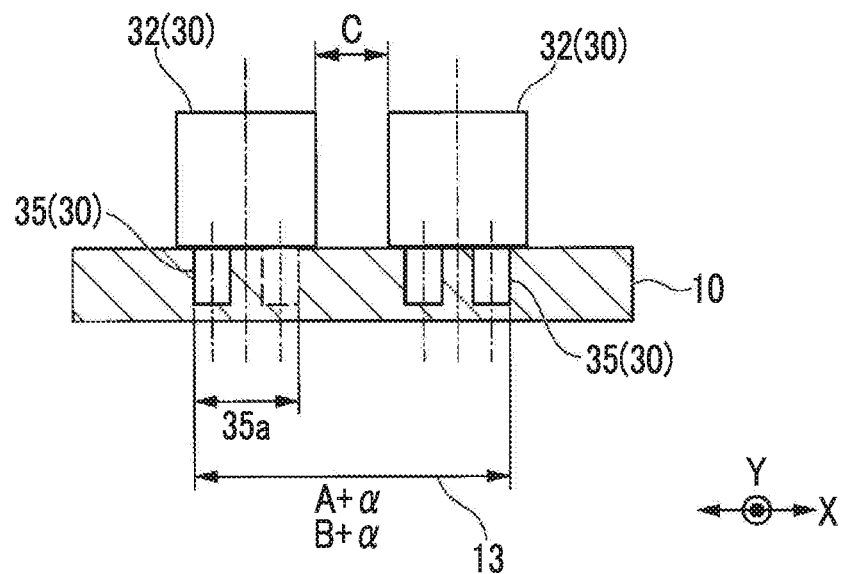
FIG. 6 is a cross-sectional view illustrating a friction stir process in a second embodiment of the plastic working method for a magnesium alloy according to the present invention.
Figure 7:
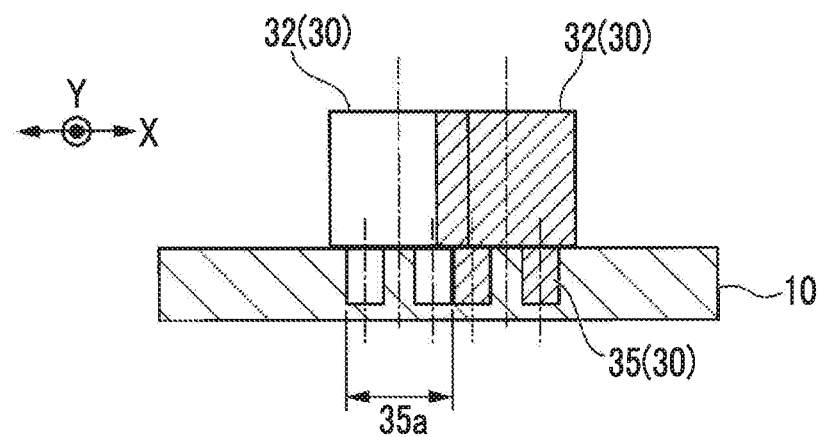
FIG. 7 is a cross-sectional view illustrating the friction stir process in the second embodiment of the plastic working method for a magnesium alloy according to the present invention.

FIG. 6 is a cross-sectional view illustrating a friction stir process in a plastic working method for a magnesium alloy in the present embodiment, and FIG. 7 is a cross-sectional view illustrating the friction stir process in the plastic working method for a magnesium alloy in the present embodiment.

A difference of the present embodiment from the above-described first embodiment is about a probe 35, and other corresponding constituent elements will be given the same reference number and will not be described again.

In the present embodiment, as illustrated in FIG. 6, the tool 30 has the probe 35 provided at an eccentric location.

The probe 35 rotates a cylindrical portion which forms a diameter 35a in accordance with the rotation of the tool 30.

Figure 8:
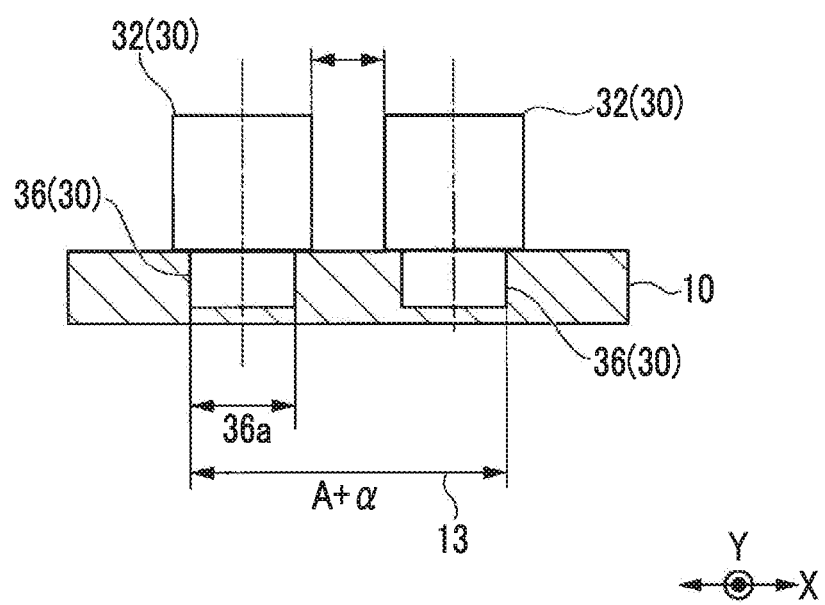
FIG. 8 is a cross-sectional view illustrating another example of the friction stir process in the second embodiment of the plastic working method for a magnesium alloy according to the present invention.

In such a case, as illustrated in FIG. 8, similar to the tool 30 having a probe 36 provided with a large diameter 36a, it is possible to set the widths of the stripe-shaped modified regions 13a to 13e in the friction stir process to the dimension 35a which is larger than 31a illustrated in FIG. 2.

Furthermore, since the probe 35 is provided at an eccentric location, it is possible to make the modification state proceed further than with the probe 31 in the first embodiment in which the same rotation speed and the same moving speed are set. Furthermore, since the probe 35 is provided at an eccentric location, the circumferential speed of the probe increases, and the plastic flow becomes faster. In addition, the input of heat increases. Therefore, the crystal grains and the intermetallic compounds are miniaturized, whereby the workability of the magnesium alloy can be improved.

In the present embodiment, as illustrated in FIG. 7, the tool 30 illustrated on the left side of the drawing indicates the X-direction location in the friction stir process carried out earlier, and the probe 35 is located in the subsequent treatment so as to be adjacent to the location of the probe 35 in the former treatment in the X direction so that the tool 30 used to treat the next adjacent stripe-shaped modified region is located in the hatched location on the right side of the drawing. At this time, it becomes possible to decrease the total of the treatment durations by setting the width in the X direction to 35a and decreasing the number of stripes corresponding to the stripe-shaped modified regions 13a to 13e so as to decrease the number of times of the friction stir process.

Meanwhile, in the above-described embodiment, the width of the friction stir region 13 is set to A+α so as to minimize the modified region, but it is also possible to far more improve the workability by setting an opening width B of the die 22 to B+α as illustrated in FIGS. 4 and 6 or, in the tool 30, setting the movement trajectory of the tool 30 so that the longest distance C between locations at which the inside of the shoulder 32 is located becomes equal to A+α as illustrated in FIGS. 4 and 6.

In addition, in the above-described embodiment, with respect to the outside surface length A of the bent portion 12, the width of the friction stir region 13 is set to A+α, but it is also possible to set the width of the friction stir region 13 to A'+α using the length A' of the bent portion 12 at the central location of the thickness t of the magnesium alloy 10 instead of the outside surface length A of the bent portion 12.

REFERENCE SIGNS LIST

10: magnesium alloy
11: bent line
12: bent portion
13: friction stir region (to-be-worked region)
13a to 13e: stripe-shaped modified regions
21: punch
22: die
30: tool
31, 35, 36: probe
31a, 35a, 36a: diameter (width)
32: shoulder
A: outside surface length
α: amount of shrinkage

The invention claimed is:

1. A plastic working method for magnesium alloy, comprising:
   modifying a workpiece formed of magnesium alloy by carrying out a friction stir process in which a probe at a tip portion of a tool is press-fitted to a surface of the workpiece and the probe being press-fitted to the surface of the workpiece is moved in a first direction parallel to the surface of the workpiece while rotating the probe around an axis line of the tool thereby the magnesium alloy in the vicinity of the probe is stirred and the surface of the workpiece is heated and softened by friction between the workpiece and the tool; and
   plastically bending the workpiece of the magnesium alloy that has been modified by the friction stir process,
   wherein a first dimension size of a first region of the workpiece to be modified by the friction stir process in a second direction orthogonal to the first direction is set to A+α, where,
   A: a second dimension size of a second region of the workpiece to be bent in the second direction, and
   α: an amount of shrinkage of the workpiece in the second direction due to the friction stir process.

2. The plastic working method for magnesium alloy according to claim 1,
   wherein the friction stir process is carried out on an entire region of the workpiece to be plastically bent.

3. The plastic working method for magnesium alloy according to claim 1,
   wherein the second dimension size of the second region of the workpiece is identical with a length of an outer arc of a bent portion of the workpiece.

4. The plastic working method for magnesium alloy according to claim 1,
   wherein, in the friction stir process, the tool rotating around the axis line alternatively repeats a first movement in which the tool is moved in the first direction and a second movement in which the tool is moved in the second direction so as to form stripes adjacent to each other in the second direction, thereby modifying the workpiece of the magnesium alloy, wherein a trace of the tool on the surface of the workpiece is formed so that stripe-shaped modified regions become continuous in a single layer.

5. The plastic working method for magnesium alloy according to claim 1,
   wherein, the first region of the workpiece has a predetermined distribution of a heat affected area formed by the friction stir process, wherein the predetermined distribution is formed throughout the first region.

6. The plastic working method for magnesium alloy according to claim 5,
   wherein a virtual bent line is set on the second region of the workpiece to be bent, the virtual bent line being positioned at a center of the second region of the workpiece in the second direction, and
   the predetermined distribution is formed such that the heat affected area, as distance increases away from the virtual bent line, is affected less by heat that is a result of the friction stir process.

* * * * *